(12) United States Patent
Chang

(10) Patent No.: US 10,767,635 B2
(45) Date of Patent: Sep. 8, 2020

(54) WIND DIRECTION AND WIND VELOCITY MEASURING APPARATUS FOR WIND TURBINE, AND DEVICE AND METHOD FOR CONTROLLING YAW ANGLE OF WIND TURBINE BY USING SAME

(71) Applicant: KOREA AEROSPACE RESEARCH INSTITUTE, Daejeon (KR)

(72) Inventor: Byeong Hee Chang, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 37 days.

(21) Appl. No.: 16/315,731

(22) PCT Filed: Jun. 1, 2017

(86) PCT No.: PCT/KR2017/005746
§ 371 (c)(1),
(2) Date: Jan. 7, 2019

(87) PCT Pub. No.: WO2018/048064
PCT Pub. Date: Mar. 15, 2018

(65) Prior Publication Data
US 2019/0242366 A1    Aug. 8, 2019

(30) Foreign Application Priority Data
Sep. 12, 2016  (KR) ........................ 10-2016-0117609

(51) Int. Cl.
*F03D 17/00*    (2016.01)
*F03D 1/00*    (2006.01)
(Continued)

(52) U.S. Cl.
CPC ............... *F03D 17/00* (2016.05); *F03D 1/00* (2013.01); *F03D 7/02* (2013.01); *F03D 7/0204* (2013.01);
(Continued)

(58) Field of Classification Search
CPC ... F03D 17/00; F03D 1/00; F03D 7/02; G01P 5/02
See application file for complete search history.

(56) References Cited

U.S. PATENT DOCUMENTS 7,347,668 B2    3/2008  Pedersen
8,235,662 B2 *  8/2012  LeClair .................. G01P 13/02
                                                   416/61

FOREIGN PATENT DOCUMENTS

EP    2 048 507 A2    4/2009
EP    2 325 480 A1    5/2011
(Continued)

OTHER PUBLICATIONS

Troels Friis Pedersen et al., "Optimization of Wind Turbine Operation by Use of Spinner Anemometer", Risø DTU National Laboratory for Sustainable Energy, Aug. 2008, pp. 1-44.

*Primary Examiner* — Jewel V Dowtin
(74) *Attorney, Agent, or Firm* — Rabin & Berdo, P.C.

(57) ABSTRACT

A technical object of the present disclosure is to provide an anemometer for a wind turbine which is capable of precisely measuring a wind velocity and a wind direction. To this end, an anemometer for a wind turbine of the present disclosure is an anemometer for a wind turbine which is used for a wind turbine including a plurality of rotating blades and a hub which is equipped at a rotation center of the plurality of rotating blades and has a nosecone and is equipped in the nosecone.

19 Claims, 8 Drawing Sheets

(51) Int. Cl.
*F03D 7/02* (2006.01)
*G01P 5/24* (2006.01)
*G01P 5/02* (2006.01)

(52) U.S. Cl.
CPC .............. *F03D 7/0224* (2013.01); *G01P 5/02* (2013.01); *G01P 5/24* (2013.01); *F05B 2270/32* (2013.01); *F05B 2270/321* (2013.01); *F05B 2270/328* (2013.01); *F05B 2270/329* (2013.01); *F05B 2270/80* (2013.01); *Y02E 10/723* (2013.01)

(56) References Cited

FOREIGN PATENT DOCUMENTS

| | | |
|---|---|---|
| EP | 2 048 507 A3 | 5/2012 |
| JP | 2007-530926 A | 11/2007 |
| JP | 2015-506444 A | 3/2015 |
| KR | 20-2010-0005051 U | 5/2010 |
| KR | 10-2013-0032530 A | 4/2013 |
| KR | 2013-0066768 A | 6/2013 |
| KR | 10-2014-0115405 A | 10/2014 |
| KR | 10-2015-0088834 A | 8/2015 |
| WO | WO 2005/093435 A1 | 10/2005 |

\* cited by examiner

WIND DIRECTION AND WIND VELOCITY MEASURING APPARATUS FOR WIND TURBINE, AND DEVICE AND METHOD FOR CONTROLLING YAW ANGLE OF WIND TURBINE BY USING SAME

CROSS-REFERENCE TO RELATED APPLICATIONS

This application claims the priority of Korean Patent Application No. 2016-0117609 filed on Sep. 12, 2016, in the Korean Intellectual Property Office, the disclosure of which is incorporated herein by reference.

BACKGROUND

Field

The present disclosure relates to a wind turbine.

Description of the Related Art

Generally, a wind turbine is a device which generates electricity by disposing a rotating blade to be opposite to a wind blowing direction.

A wind turbine of the related art includes a vertical axis 11, a nacelle 12 equipped at an upper portion of the vertical axis 11, a plurality of rotating blades 13 equipped at a front side of the nacelle 12, and a hub 14 which forms a rotation center of the plurality of rotating blades 13. Therefore, when the rotating blades 13 rotate by the wind, a rotary shaft of the hub 14 rotates together to generate electricity from the nacelle 12.

Specifically, in order to dispose the rotating blade 13 to be opposite to a wind blowing direction, an anemometer 15 which measures a wind velocity and a wind direction is installed to be vertical to an upper surface of a cover of a nacelle 12.

However, since the anemometer 15 is located on a cover of the nacelle 12 located behind the rotating blade 13, awake generated by the rotation of the rotating blade 13 directly affects the wind turbine of the related art so that it is difficult to precisely measure the wind velocity and the wind direction. Ultimately, there is a limitation of matching a wind blowing direction and the direction of the rotary shaft so that there is a limitation of disposing the rotating blade 13 to be opposite to the wind blowing direction. Therefore, there is a problem in that the electricity generation efficiency of the wind turbine is lowered.

SUMMARY

An object to be achieved by the present disclosure is to provide an anemometer for a wind turbine which is capable of precisely measuring a wind velocity and a wind direction.

Another object to be achieved by the present disclosure is to provide an apparatus and a method for controlling a yaw angle of a wind turbine which dispose a rotating blade to be opposite to a wind blowing direction to precisely measure a wind velocity and a wind direction, thereby improving an efficiency of electricity generation.

In order to achieve the above-mentioned object, according to an aspect of the present disclosure, an anemometer for a wind turbine is used for a wind turbine including a plurality of rotating blades and a hub which is equipped at a rotation center of the plurality of rotating blades and has a nosecone (in other words, a spinner) and is equipped in the nosecone.

The anemometer for a wind turbine according to an exemplary embodiment of the present disclosure described above includes: a first ultrasonic sensor which oscillates a first ultrasonic wave and receives a second ultrasonic wave; a second ultrasonic sensor which oscillates the second ultrasonic wave and receives the first ultrasonic wave; a third ultrasonic sensor which oscillates a third ultrasonic wave in a first direction intersecting the first ultrasonic wave and receives a fourth ultrasonic wave in a second direction opposing to the first direction; and a fourth ultrasonic sensor which oscillates the fourth ultrasonic wave in the second direction and receives the third ultrasonic wave in the first direction, in which the first and second ultrasonic sensors measure a first wind velocity in the same direction as the transmitting direction of the first ultrasonic wave and the third and fourth ultrasonic sensors measure a second wind velocity in the same direction as the transmitting direction of the third ultrasonic wave.

The anemometer may further include a support unit which supports the first, second, third, and fourth ultrasonic sensors to the nosecone and the first, second, third, and fourth ultrasonic sensors, the support unit, and a rotary shaft of the hub are disposed on one plane.

The support unit may include a center support shaft which is equipped in the nosecone to be disposed to coincide with an axial direction of the rotary shaft; a first support member which is branched at a distal end of the center support shaft and supports the first ultrasonic sensor and the fourth ultrasonic sensor, and a second support member which is branched at a distal end of the center support shaft and supports the second ultrasonic sensor and the third ultrasonic sensor.

The first support member may include a first branching unit branched at the center support shaft; and a first mounting unit which is equipped at a distal end of the first branching unit and supports the first ultrasonic sensor and the fourth ultrasonic sensor at both ends, and the second support member may include a second branching unit branched at the center support shaft; and a second mounting unit which is equipped at a distal end of the second branching unit and supports the second ultrasonic sensor and the third ultrasonic sensor at both ends.

An anti-freezing hot wire may be equipped in each of the first and second mounting units.

The transmitting direction of the first ultrasonic wave and the transmitting direction of the third ultrasonic wave may be disposed on the same line, as seen from the direction of the rotary shaft.

According to another aspect of the present disclosure, a yaw angle control apparatus of a wind turbine is a yaw angle control apparatus of a wind turbine using the anemometer according to the above-described aspect of the present disclosure and includes: an arithmetic unit which calculates a velocity of the axial wind blowing in an axial direction of the rotary shaft of the hub and a velocity of the cross wind blowing in a direction which is vertical to the rotary shaft and is horizontal with the ground using first and second wind velocities measured by the anemometer; and a control unit which controls the yaw angle of the rotary shaft using the velocity of the cross wind calculated by the arithmetic unit.

The arithmetic unit may calculate the velocity of the axial wind and the velocity of the cross wind by the following Equations 1 and 2.

$$\vec{U1} = \vec{U} \times \cos\theta + (\vec{V} \times \cos\phi + \vec{W} \times \sin\phi) = \sin\theta$$

$$\vec{U2} \times \vec{U} \times \cos\theta - (\vec{V} \times \cos\phi + \vec{W} \times \sin\phi) = \sin\theta \quad\quad \text{[Equation 1]}$$

Here, $\vec{U1}$ is a first wind velocity measured by the anemometer, $\vec{U2}$ is a second wind velocity measured by the anemometer, θ is a half an angle between $\vec{U1}$ and $\vec{U2}$, and φ is a rotation angle of the nosecone and when $\vec{U1}$ and $\vec{U2}$ are parallel to the ground, φ is "zero" degree.

$$\vec{U}=(\vec{U1}+\vec{U2})/(2\times\cos\theta)$$

$$\vec{V}=(\vec{U1}-\vec{U2})/(2\times\cos\phi\times\sin\theta)-\vec{W}\times\tan\phi \quad \text{[Equation 2]}$$

Here, $\vec{U}$ is a velocity of the axial wind, $\vec{V}$ is a velocity of a cross wind, and $\vec{W}$ is a velocity of a vertical wind blowing in a direction perpendicular to the ground.

As the velocity $\vec{V}$ of the cross wind, an average value when φ is "0" degree and "180" degrees may be used.

The control unit may perform an operation including: determining whether an absolute value of the velocity of the cross wind is smaller than an allowable reference value; and adjusting the yaw angle when the absolute value of the velocity of the cross wind is equal to or larger than the reference value.

In the adjusting of the yaw angle, the yaw angle of the rotary shaft may be controlled such that a magnitude of the velocity of the cross wind is reduced.

The control unit may perform an operation further including: starting adjusting a pitch angle of the blade so as to interwork with the axial wind when the absolute value of the velocity of the cross wind is smaller than the reference value.

According to still another aspect of the present disclosure, a yaw angle control method of a wind turbine is a yaw angle control method of a wind turbine using the yaw angle control apparatus of a wind turbine according to another aspect of the present disclosure and includes: measuring the first and second wind velocities; calculating a velocity of the axial wind and a velocity of the cross wind using the measured first and second wind velocities; and controlling a yaw angle of the rotary shaft using the calculated velocity of the cross wind.

As described above, the anemometer for a wind turbine according to exemplary embodiments of the present disclosure and an apparatus and a method for controlling a yaw angle of a wind turbine using the same have the following effects:

According to an exemplary embodiment of the present disclosure, since an anemometer for a wind turbine provides a technical configuration equipped in a nosecone of a hub of a wind turbine, the anemometer for a wind turbine is not affected by the wake generated by the rotation of the rotating blade, thereby precisely measuring a wind velocity and a wind direction.

According to another exemplary embodiment of the present disclosure, provided is a technical configuration which includes an anemometer for a wind turbine according to the exemplary embodiment of the present disclosure described above, an arithmetic unit, and a control unit and measures first and second wind velocities in interesting directions by the anemometer for a wind turbine equipped in a nosecone, calculates a velocity of an axial wind and a velocity of a crosswind using the first and second wind velocities by the arithmetic unit, and controls a yaw angle of the rotary shaft and a pitch angle of a rotating blade using the velocities of the axial wind and the cross wind. Therefore, the velocities of the axial wind and the cross wind may be precisely measured without being affected by the wake of the rotating blade and the rotating blades may be aligned to be opposite to the wind blowing direction as much as possible, thereby improving an electricity generation efficiency of the wind turbine.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

The present disclosure will be described more fully hereinafter with reference to the accompanying drawings so as to be easily carried by those skilled in the art. However, the present disclosure can be realized in various different forms, and is not limited to the exemplary embodiments described herein.

Figure 1:
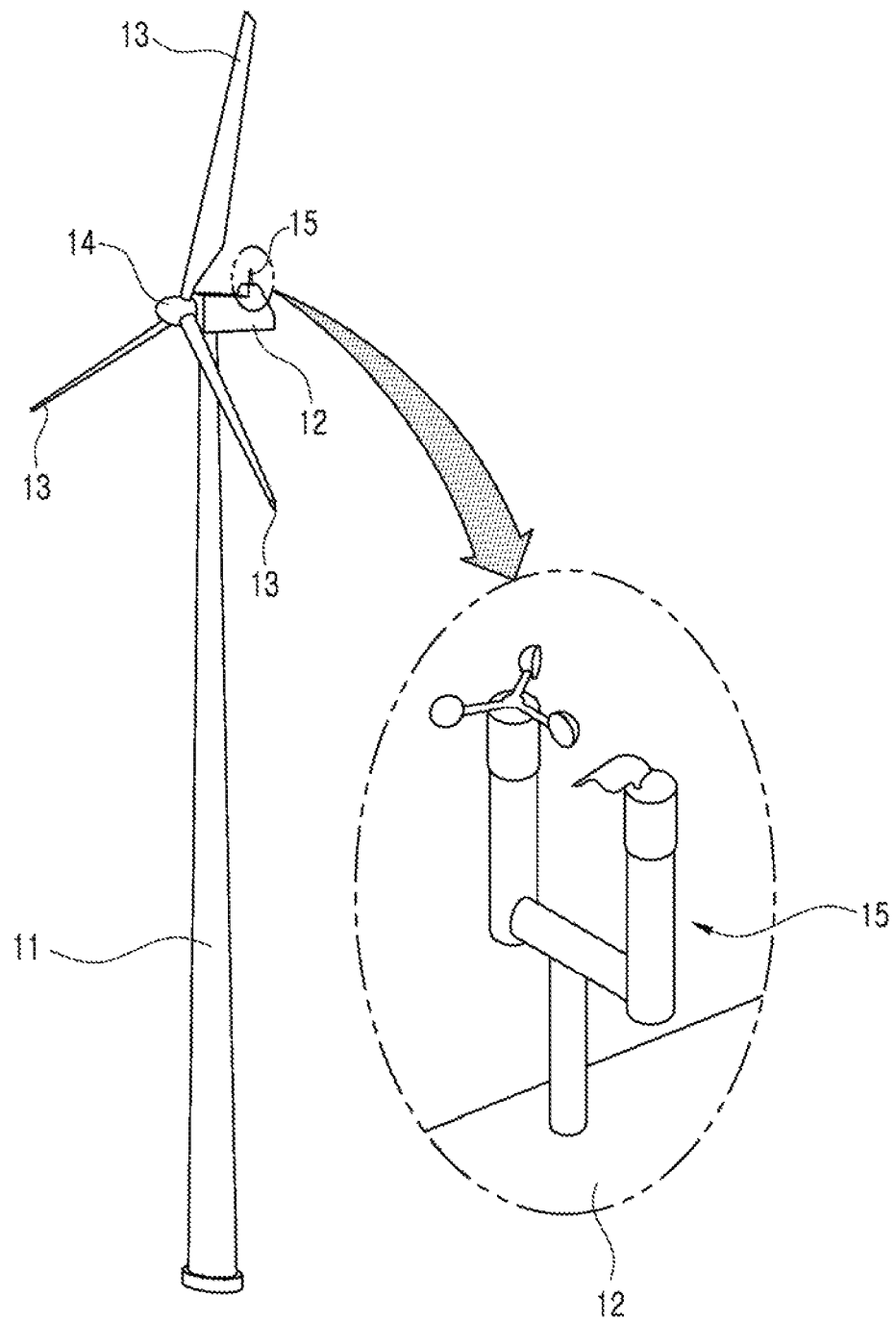
FIG. 1 is a view schematically illustrating a wind turbine of the related art.
Figure 2:
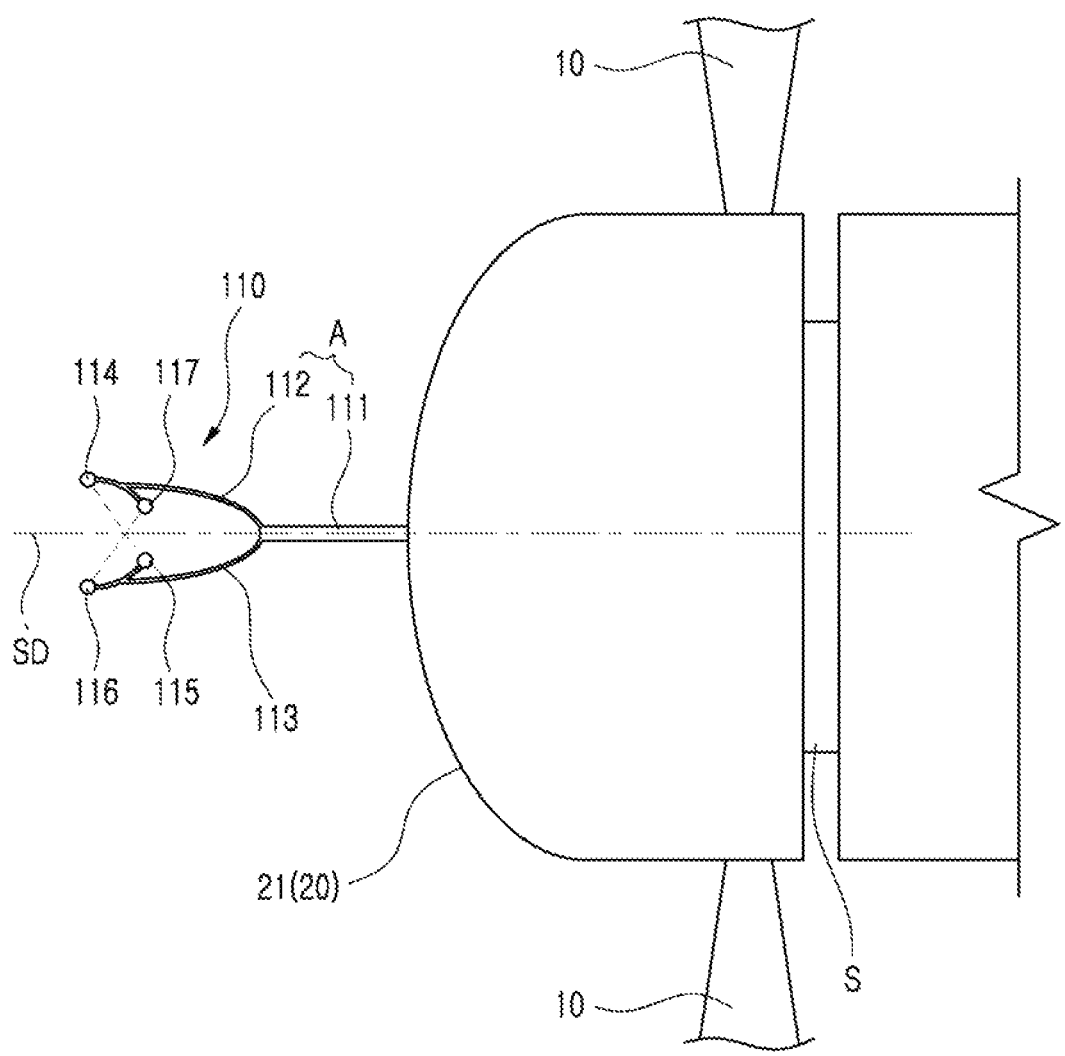
FIG. 2 is a plan view schematically illustrating a state where an anemometer for a wind turbine according to an exemplary embodiment of the present disclosure is equipped in a nosecone.
Figure 3:
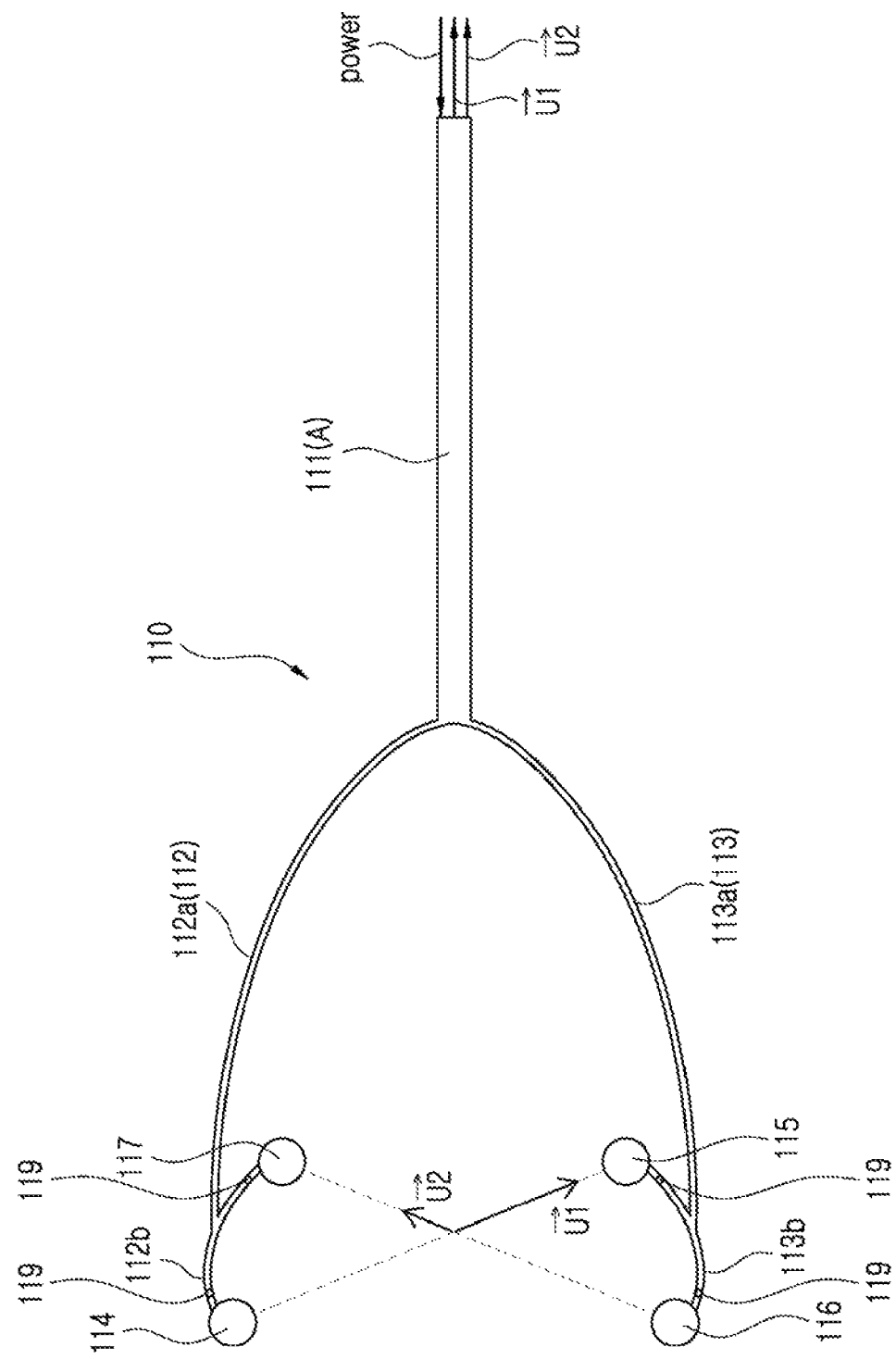
FIG. 3 is an enlarged view illustrating the anemometer for a wind turbine of FIG. 2.

FIG. 2 is a plan view schematically illustrating a state where an anemometer for a wind turbine according to an exemplary embodiment of the present disclosure is equipped in a nosecone and FIG. 3 is an enlarged view illustrating the anemometer for a wind turbine of FIG. 2.

As illustrated in FIG. 2, an anemometer 110 for a wind turbine according to an exemplary embodiment of the present disclosure is used for a wind turbine including a plurality of rotating blades 10 and a hub 20 which is equipped at a rotation center of the plurality of rotating blades 10 and has a nosecone 21 and is equipped in the nosecone 21. Specifically, the anemometer 110 for a wind turbine according to an exemplary embodiment of the present disclosure may be equipped at a center of a front end of the nosecone 21.

Therefore, the anemometer 110 for a wind turbine of the present disclosure is not affected by a wake generated by the rotation of the rotating blades 10 so that it is possible to precisely measure a wind velocity and a wind direction.

Specifically, as illustrated in FIGS. 2 and 3, the anemometer for a wind turbine according to the above-described exemplary embodiment of the present disclosure may include a first ultrasonic sensor 114, a second ultrasonic sensor 115, a third ultrasonic sensor 116, and a fourth ultrasonic sensor 117. The first ultrasonic sensor 114 oscillates a first ultrasonic wave and receives a second ultrasonic wave from the second ultrasonic sensor 115 and the second ultrasonic sensor 115 oscillates the second ultrasonic wave and receives the first ultrasonic wave from the first ultrasonic sensor 114. The third ultrasonic sensor 116 oscillates a third ultrasonic wave in a first direction intersecting the first ultrasonic wave and receives a fourth ultrasonic wave transmitting in a second direction which is opposite to the first direction, from the fourth sensor 117. The fourth ultrasonic sensor 117 oscillates the fourth ultrasonic wave in the second direction and receives the third ultrasonic wave transmitting in the first direction, from the third ultrasonic sensor 116. Therefore, the first and second ultrasonic sensors 114 and 115 may measure a first wind velocity $\vec{U1}$ in the same direction as a transmitting direction of the first ultrasonic wave and the third and fourth ultrasonic sensors 116 and 117 may measure a second wind velocity $\vec{U2}$ in the same direction as a transmitting direction of the third ultrasonic wave. Ultimately, the anemometer 110 for a wind turbine of the present disclosure may sense the first and second wind velocities $\vec{U1}$ and $\vec{U2}$ in directions intersecting each other as illustrated in FIG. 3.

For reference, based on a fact that a propagation velocity of a sound wave depends on a wind velocity, a first wind velocity $\vec{U1}$ is measured using a difference of a time when the second ultrasonic wave arrives the first ultrasonic sensor 114 and a time when the first ultrasonic wave arrives at the second ultrasonic sensor 115 and a second wind velocity $\vec{U2}$ is measured using a difference of a time when the fourth ultrasonic wave arrives at the third ultrasonic sensor 116 and a time when the third ultrasonic wave arrives at the fourth ultrasonic sensor 117. This is the same as the measurement principle of an existing ultrasonic anemometer, so that a specific description will be omitted.

Figure 6:
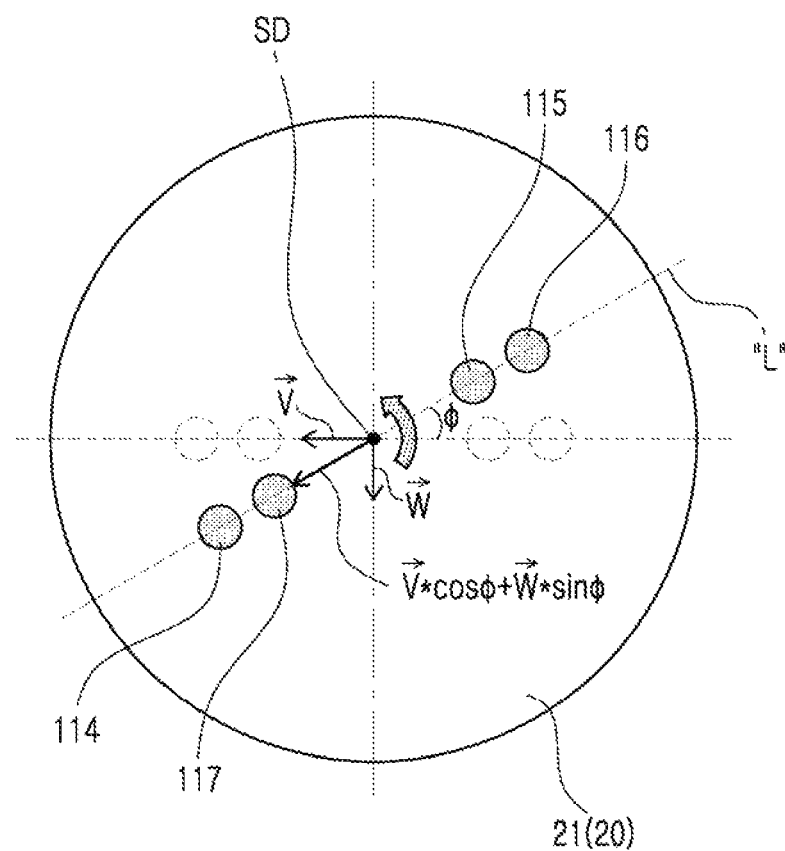
FIG. 6 is a front view schematically illustrating a state where a nosecone of FIG. 2 rotates by a rotation angle (I)

Further, as illustrated in FIGS. 2 and 3, the anemometer 110 for a wind turbine according to the above-described exemplary embodiment of the present disclosure may further include a support unit A which supports the first, second, third, and fourth ultrasonic sensors 114, 115, 116, and 117 to the nosecone 21. Specifically, the first, second, third, and fourth ultrasonic sensors 114, 115, 116, and 117, the support unit A, and the rotary shaft S of the hub 20 may be disposed on one plane. In addition to this, as illustrated in FIG. 6, the first, second, third, and fourth ultrasonic sensors 114, 115, 116, and 117, the support unit (not illustrated), and the rotary shaft (see SD) of the hub 20 may be disposed on the same line L so as to dispose the transmitting direction of the first ultrasonic wave and the transmitting direction of the second ultrasonic wave on the same line L, as seen from the direction of the rotary shaft S.

Specifically, even though not illustrated in the drawing, when the first, second, third and fourth ultrasonic sensors (not illustrated) are upwardly installed on the nosecone (21 in FIG. 2) by the support unit (not illustrated), due to this structure, pr measurement is difficult due to amount of interference with the wind blowing in the axial direction (SD in FIG. 2) of the rotary shaft (S in FIG. 2). Further, when it is considered that a wind blowing a direction which is perpendicular to the rotary shaft S and horizontal with the ground is insignificant, but the wind blowing in the axial direction SD of the rotary shaft S is dominant, as illustrated in FIG. 2, if the first, second, third, and fourth ultrasonic sensors 114, 115, 116, and 117 are disposed by the support unit A so as to intersect the first and third ultrasonic waves on an extending line (see SD) of the rotary shaft S, it is possible to precisely measure the first and second wind velocities $\vec{U1}$ and $\vec{U2}$.

Further, as illustrated in FIGS. 2 and 3, the support unit A may include a center support shaft 111, a first support member 112, and a second support member 113. The center support shaft 111 is equipped in the nosecone 21 to coincide with the axial direction SD of the rotary shaft S. The first support member 112 is branched at a distal end of the center support shaft 111 and supports the first ultrasonic sensor 114 and the fourth ultrasonic sensor 117 and the second support member 113 is branched at a distal end of the center support shaft 111 and supports the second ultrasonic sensor 115 and the third ultrasonic sensor 116. Specifically, as illustrated in FIGS. 2 and 3, the first and second support members 112 and 113 may be symmetrical with respect to the center support shaft 111 so as to be disposed on one plane.

Moreover, as illustrated in FIGS. 2 and 3, the first support member 112 may include a first branching unit 112a branched from the center support shaft 111 and a first mounting unit 112b which is provided at a distal end of the first branching unit 112a and supports the first ultrasonic sensor 114 and the fourth ultrasonic sensor 117 at both ends. Further, the second support member 113 may include a second branching unit 113a branched from the center support shaft 111 and a second mounting unit 113b which is provided at a distal end of the second branching unit 113a and supports the second ultrasonic sensor 115 and the third ultrasonic sensor 116 at both ends.

Further, each of the first and second mounting units 112b and 113b may be equipped with an anti-freezing hot wire 119 for de-icing in the winter. For example, two anti-freezing hot wires 119 are equipped in the first mounting unit 112b to be adjacent to the first and fourth ultrasonic sensors 114 and 117. Further, another two anti-freezing hot wires 119 are equipped in the second mounting unit 113b to be adjacent to the second and third ultrasonic sensors 115 and 116.

Hereinafter, a yaw angle control apparatus of a wind turbine according to another exemplary embodiment of the present disclosure will be described with reference to FIGS. 2 to 7.

Figure 4:
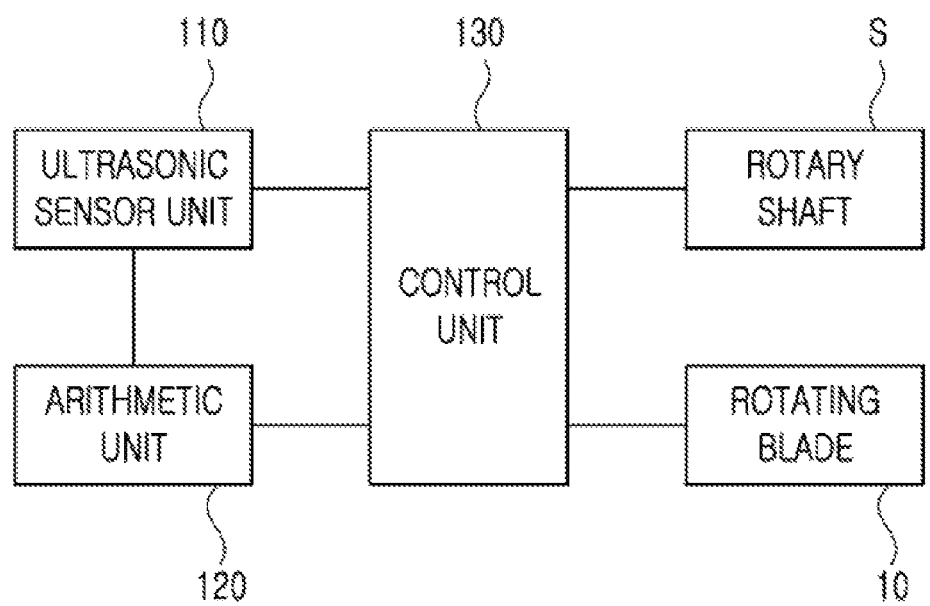
FIG. 4 is a block diagram schematically illustrating a yaw angle control apparatus of a wind turbine according to another exemplary embodiment of the present disclosure.
Figure 5:
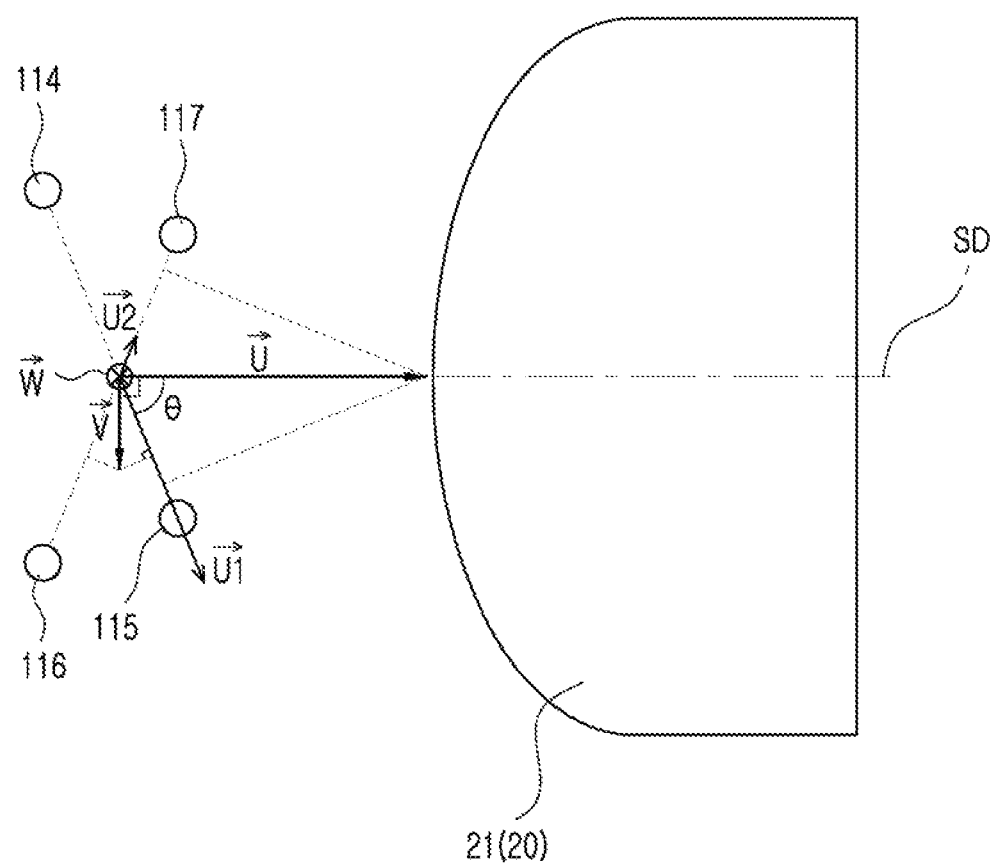
FIG. 5 is a view illustrating a vector composition between velocities of an axial wind and a cross wind and first and second wind velocities measured by an anemometer.
Figure 7:
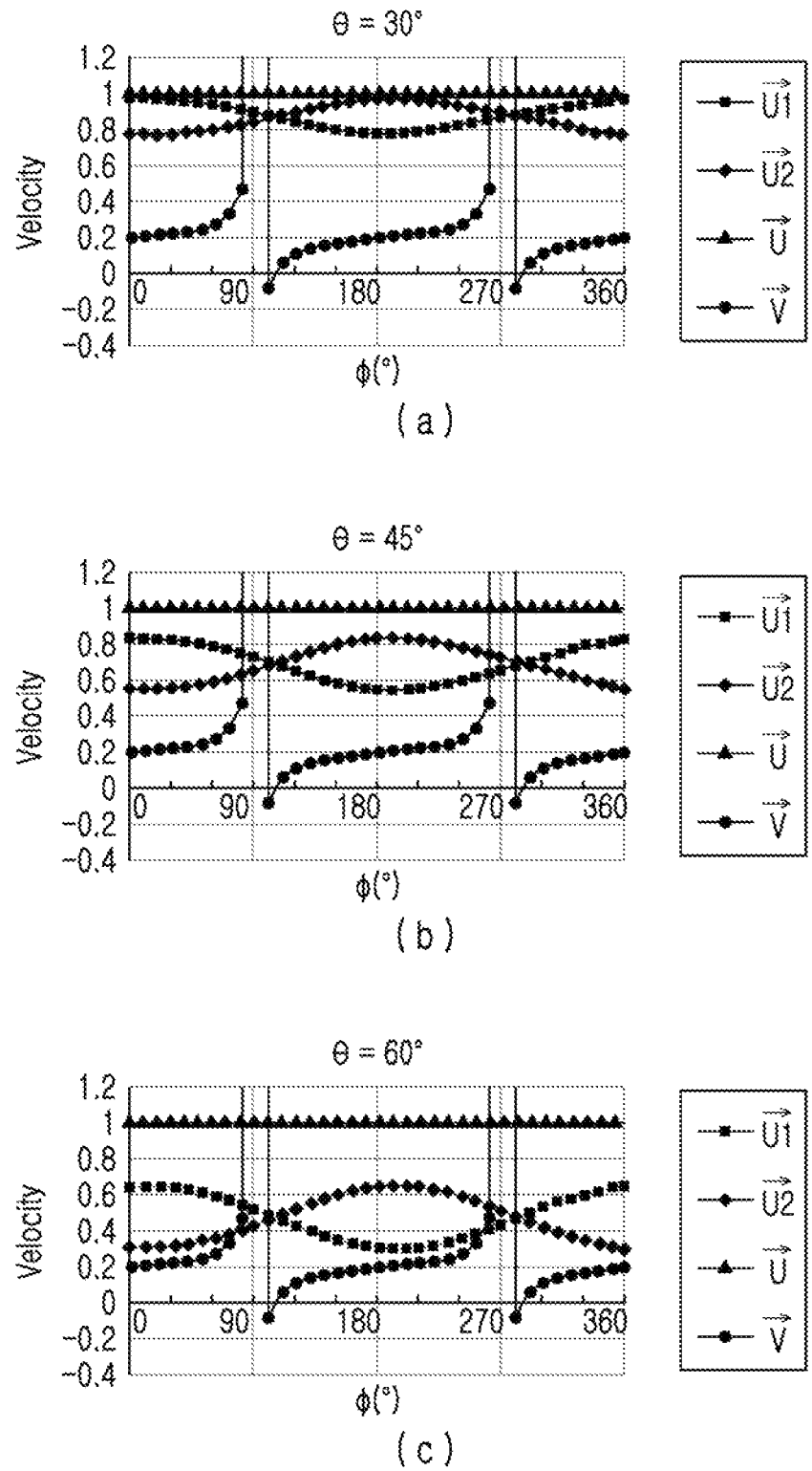
FIG. 7 is a graph illustrating first and second wind velocities which vary by a rotation angle of a nosecone and velocities of axial wind and cross wind which are constantly maintained.

FIG. 4 is a block diagram schematically illustrating a yaw angle control apparatus of a wind turbine according to another exemplary embodiment of the present disclosure, FIG. 5 is a view illustrating a vector composition between velocities of an axial wind and a cross wind and first and second wind velocities measured by an anemometer, FIG. 6 is a front view schematically illustrating a state where the nosecone of FIG. 2 rotates by a rotation angle φ, and FIG. 7 is a graph illustrating first and second wind velocities which vary by a rotation angle of a nosecone and velocities of axial wind and cross wind which are constantly maintained.

As illustrated in FIGS. 2 to 7, a yaw angle control apparatus of a wind turbine according to another exemplary embodiment of the present disclosure is a yaw angle control apparatus for a wind turbine including a plurality of rotating blades 10 and a hub 20 which is equipped at a rotation center of the plurality of rotating blades 10 and has a nosecone 21. The above-described yaw angle control apparatus of a wind turbine includes the anemometer 110 according to the exemplary embodiment of the present disclosure, an arithmetic unit 120, and a control unit 130. Hereinafter, components will be described in detail with reference to FIGS. 2 to 7 continuously.

As illustrated in FIGS. 2, 3, and 5 anemometer 110 is a component which measures first and second wind velocities $\vec{U1}$ and $\vec{U2}$ in intersecting directions and mentioned in the above-described exemplary embodiment of the present disclosure, so that a specific description will be omitted.

The arithmetic unit 120 is a component which calculates a velocity $\vec{U}$ of the axial wind blowing in an axial direction SD of the rotary shaft S of the hub 20 and a velocity $\vec{V}$ of the cross wind blowing in a direction which is perpendicular to the rotary shaft S and is horizontal with the ground using first and second wind velocities $\vec{U1}$ and $\vec{U2}$ measured by the anemometer 110.

Specifically, the arithmetic unit 120 may calculate the velocity $\vec{U}$ of the axial wind and the velocity $\vec{V}$ of the cross wind by the following Equations 1 and 2. That is, the first and second wind velocities $\vec{U1}$ and $\vec{U2}$ measured by the anemometer 110 may be converted using a velocity $\vec{U}$ of the axial wind, a velocity $\vec{V}$ of a cross wind, and a velocity $\vec{W}$ of a vertical wind as represented in the following Equations.

$$\vec{U1}=\vec{U}\times\cos\theta+(\vec{V}\times\cos\phi+\vec{W}\times\sin\phi)=\sin\theta$$

$$\vec{U2}\times\vec{U}\times\cos\theta-(\vec{V}\times\cos\phi+\vec{W}\times\sin\phi)=\sin\theta \quad \text{[Equation 1]}$$

Here, $\vec{U1}$ is a first wind velocity measured by the anemometer 110, $\vec{U2}$ is a second wind velocity measured by the anemometer 110, $\theta$ is a half an angle between $\vec{U1}$ and $\vec{U2}$, and $\phi$ is a rotation angle of the nosecone 21. When $\vec{U1}$ and $\vec{U2}$ are parallel to the ground, $\phi$ is "zero" degree.

$$\vec{U}=(\vec{U1}+\vec{U2})/(2\times\cos\theta)$$

$$\vec{V}=(\vec{U1}-\vec{U2})/(2\times\cos\phi\times\sin\theta)-\vec{W}\times\tan\phi \quad \text{[Equation 2]}$$

Here, $\vec{U}$ is a velocity of the axial wind, $\vec{V}$ is a velocity of a cross wind, and $\vec{W}$ is a velocity of a vertical wind blowing in a direction perpendicular to the ground.

However, since the velocity $\vec{W}$ of the vertical wind is not measured so that the velocity $\vec{W}$ is not known, if the velocity $\vec{W}$ of the vertical wind is ignored, the velocity $\vec{V}$ of the cross wind may be represented by the following equation.

$$\vec{V}=(\vec{U1}-\vec{U2})/2\times\cos\phi\times\sin\theta)$$

Only when "$\phi$" is "0" degree and "180" degrees, the velocity $\vec{V}$ of the cross wind calculated by the above Equation becomes a precise value.

Specifically, as illustrated in FIG. 7, even though the first and second wind velocities $\vec{U1}$ and $\vec{U2}$ sensed by the anemometer 110 vary depending on "$\theta$" and "$\phi$", as a composition result of the vectors, the velocity $\vec{U}$ of the axial wind is always calculated as a precise value (for example, 1.0). However the velocity $\vec{V}$ of the cross wind is calculated as a precise value (for example, 0.2) only when "$\phi$" is "0" degree and "180" degrees.

Further, in the case of an actual anemometer 110, the ultrasonic wave may oscillate with a constant interval so that when "$\phi$" is "0" degree and "180" degrees, the wind velocity may not be necessarily measured. In this case, "$\phi$" is interpolated with a value of approximately "0" degree and "180" degrees so that a velocity $\vec{V}$ of a cross wind when "$\phi$" is 0 degree and 180 degrees may be obtained. Theoretically, since velocities $\vec{V}$ of a cross wind when "$\phi$" is 0 degree and 180 degrees may not exactly match, an average of two values may be used as the velocity $\vec{V}$ of the cross wind.

Moreover, as illustrated in FIG. 7, it is understood that since the larger the "$\theta$", the larger the variation range of the first and second wind velocities $\vec{U1}$ and $\vec{U2}$, the sensitivity of the velocity $\vec{V}$ of the cross wind is increased.

The control unit 130 is a component of controlling a yaw angle of the rotary shaft S and a pitch angle of the rotating blade 10 using the velocity $\vec{U}$ of the axial wind and the velocity $\vec{V}$ of the cross wind calculated by the arithmetic unit 120.

Specifically, the control unit 130 determines whether an absolute value of the velocity $\vec{V}$ of the cross wind is smaller than an allowable reference value. Thereafter, when the absolute value of the velocity $\vec{V}$ of the cross wind is equal to or larger than the reference value, a yaw angle of the rotary shaft S may be adjusted. For reference, as the allowable reference value becomes smaller, the rotating blade 10 may be aligned to be opposite to the wind blowing direction as much as possible.

For example, the yaw angle of the rotary shaft S may be controlled such that the magnitude of the velocity $\vec{V}$ of the cross wind is reduced. Therefore, the rotating blade 10 is aligned to be opposite to the wind blowing direction as much as possible by controlling the yaw angle of the rotary shaft S so that the electricity generation efficiency of the wind turbine may be improved.

Moreover, when the absolute value of the velocity $\vec{V}$ of the cross wind is smaller than the reference value, the control unit 130 starts adjusting a pitch angle of the rotating blade 10 (that is, an installation angle of the rotating blade) so as to interwork with the velocity $\vec{U}$ of the cross wind. More, the details for controlling the pitch angle of the rotating blade 10 are not the subject of the present disclosure, so that the description will be omitted.

In the meantime, the above-described control unit 130 may be implemented as one or more microprocessors which operate by a set program and the set program may include a series of commands for executing individual steps included in a method according to another exemplary embodiment of the present disclosure which will be described below.

A yaw angle control method of a wind turbine according to another exemplary embodiment of the present disclosure will be described below.

Figure 8:
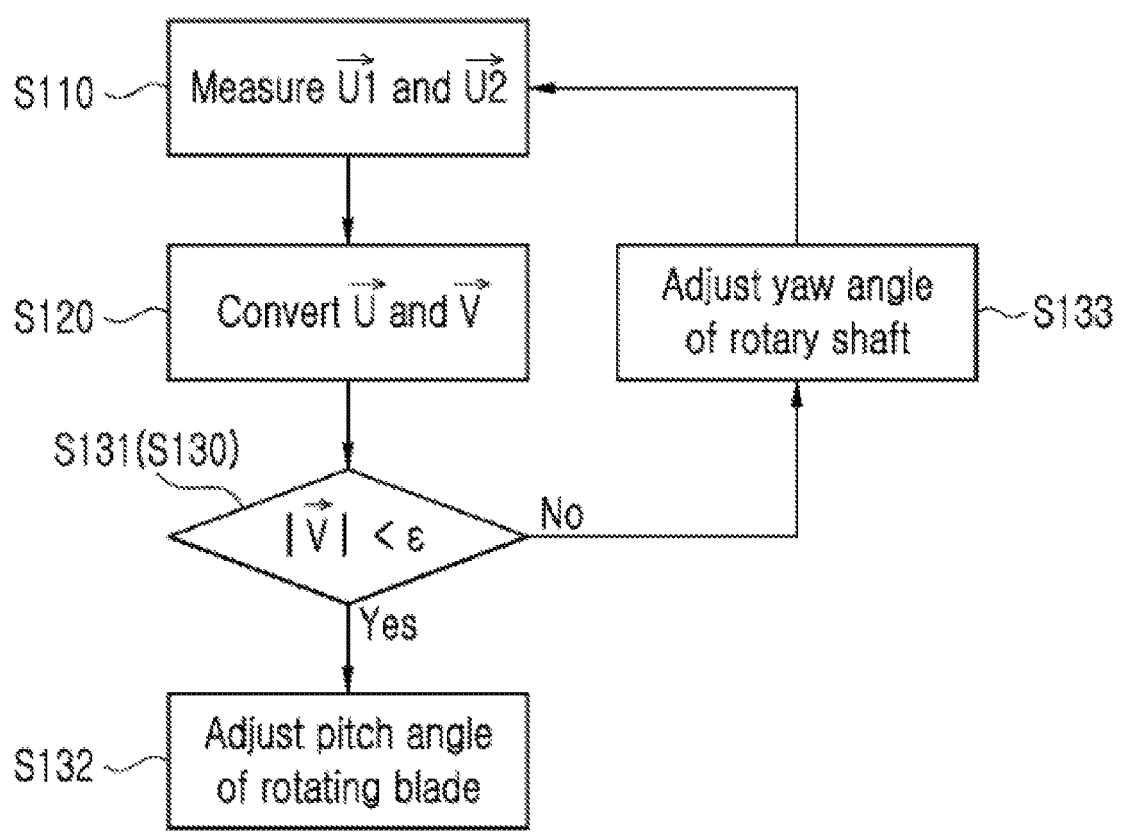
FIG. 8 is a flowchart illustrating a method for controlling a yaw angle of a wind turbine according to another exemplary embodiment of the present disclosure.

First, as illustrated in FIG. 8, the first and second wind velocities $\vec{U1}$ and $\vec{U2}$ are measured using the anemometer 110 in step S110. Next, the first and second wind velocities $\vec{U1}$ and $\vec{U2}$ are calculated as a velocity $\vec{U}$ of an axial wind and a velocity $\vec{V}$ of a cross wind using the arithmetic unit 120 in step S120. Next, a yaw angle of the rotary shaft S is controlled using the calculated velocity $\vec{V}$ of a cross wind in step S130.

Here, the velocity $\vec{U}$ of an axial wind and the velocity $\vec{V}$ of a cross wind are calculated by Equations 1 and 2 mentioned in the above-described yaw angle control apparatus of a wind turbine according to the present disclosure so that a specific description will be omitted.

During the control step S130, as illustrated in FIG. 8, it is determined whether an absolute value of the velocity $\vec{V}$ of a cross wind is smaller than an allowable reference value ε in step S131. Thereafter, when the absolute value of the velocity $\vec{V}$ of a cross wind is equal to or larger than the allowable reference value ε, a yaw angle of the rotary shaft S is adjusted in step S133. For reference, as the allowable reference value ε becomes smaller, the rotating blade 10 may be aligned to be opposite to the wind blowing direction as much as possible.

For example, the yaw angle of the rotary shaft S may be controlled such that the magnitude of the velocity $\vec{V}$ of the cross wind is reduced. Therefore, the rotating blade 10 is aligned to be opposite to the wind blowing direction as much as possible by controlling the yaw angle of the rotary shaft S so that the electricity generation efficiency of the wind turbine may be improved.

Moreover, when the absolute value of the velocity $\vec{V}$ of the cross wind is smaller than the reference value ε, the control unit 130 starts adjusting a pitch angle of the rotating blade 10 (that is, an installation angle of the rotating blade) so as to interwork with the velocity $\vec{U}$ of the axial wind in step S132.

As described above, the anemometer for a wind turbine according to exemplary embodiments of the present disclosure and an apparatus and a method for controlling a yaw angle of a wind turbine using the same have the following effects:

According to an exemplary embodiment of the present disclosure, an anemometer 110 for a wind turbine provides a technical configuration equipped in a nosecone 21 of a hub 20 of a wind turbine so that the anemometer 110 for a wind turbine is not affected by the wake generated by the rotation of the rotating blade 10, thereby precisely measuring a wind velocity and a wind direction.

According to another exemplary embodiment of the present disclosure, a technical component which includes an anemometer 110 for a wind turbine according to an exemplary embodiment of the present disclosure, an arithmetic unit 120, and a control unit 130 is provided. The anemometer 110 for a wind turbine equipped in the nosecone 21 measures first and second wind velocities $\vec{U1}$ and $\vec{U2}$ in intersecting directions, the arithmetic unit 120 calculates a velocity $\vec{U}$ of an axial wind and the velocity $\vec{V}$ of a cross wind using the first and second wind velocities $\vec{U1}$ and $\vec{U2}$, and a yaw angle of the rotary shaft S and the pitch angle of the rotating blade 10 are controlled using the velocities $\vec{U}$ and $\vec{V}$ of the axial wind and the cross wind. Therefore, it is possible to precisely measure velocities $\vec{U}$ and $\vec{V}$ of the axial wind and the cross wind without being affected by the wake generated by the rotation of the rotating blade 10 and dispose the rotating blade 10 to be opposite to a wind blowing direction as much as possible, so that the electricity generation efficiency of the wind turbine may be improved.

What is claimed is:

1. An anemometer for a wind turbine which is used for a wind turbine including a plurality of rotating blades and a hub which is equipped at a rotation center of the plurality of rotating blades and has a nosecone,
   wherein the anemometer is equipped in the nosecone; and
   wherein the anemometer comprises:
   a first ultrasonic sensor which oscillates a first ultrasonic wave and receives a second ultrasonic wave;
   a second ultrasonic sensor which oscillates the second ultrasonic wave and receives the first ultrasonic wave;
   a third ultrasonic sensor which oscillates a third ultrasonic wave in a first direction intersecting the first ultrasonic wave and receives a fourth ultrasonic wave in a second direction opposing to the first direction; and
   a fourth ultrasonic sensor which oscillates the fourth ultrasonic wave in the second direction and receives the third ultrasonic wave in the first direction,
   wherein the first and second ultrasonic sensors measure a first wind velocity in a same direction as a transmitting direction of the first ultrasonic wave and
   the third and fourth ultrasonic sensors measure a second wind velocity in a same direction as a transmitting direction of the third ultrasonic wave.

2. The anemometer according to claim 1, further comprising:
   a support unit which supports the first, second, third, and fourth ultrasonic sensors to the nosecone,
   wherein the first, second, third, and fourth ultrasonic sensors, the support unit, and a rotary shaft of the hub are disposed on one plane.

3. The anemometer according to claim 2, wherein the support unit includes:
   a center support shaft which is equipped in the nosecone to be disposed to coincide with an axial direction of the rotary shaft;
   a first support member which is branched at a distal end of the center support shaft and supports the first ultrasonic sensor and the fourth ultrasonic sensor; and
   a second support member which is branched at a distal end of the center support shaft and supports the second ultrasonic sensor and the third ultrasonic sensor.

4. The anemometer according to claim 3, wherein the first support member includes:
   a first branching unit branched at the center support shaft; and
   a first mounting unit which is equipped at a distal end of the first branching unit and supports the first ultrasonic sensor and the fourth ultrasonic sensor at ends of the first mounting unit, and
   the second support member includes:
   a second branching unit branched at the center support shaft; and
   a second mounting unit which is equipped at a distal end of the second branching unit and supports the second ultrasonic sensor and the third ultrasonic sensor at ends of the second mounting unit.

5. The anemometer according to claim 4, wherein an anti-freezing hot wire is equipped in each of the first and second mounting units.

6. The anemometer according to claim 3, wherein the transmitting direction of the first ultrasonic wave and the transmitting direction of the third ultrasonic wave are disposed on a same line, as seen from the direction of the rotary shaft.

7. A yaw angle control apparatus of a wind turbine using the anemometer according to claim 1, comprising:
   an arithmetic unit which calculates a velocity of an axial wind blowing in an axial direction of the rotary shaft of the hub and a velocity of a cross wind blowing in a direction which is perpendicular to the rotary shaft and is horizontal with a ground using the first and second wind velocities measured by the anemometer; and a control unit which controls a yaw angle of the rotary shaft using the velocity of the cross wind calculated by the arithmetic unit.

8. The yaw angle control apparatus according to claim 7 wherein the arithmetic unit calculates the velocity of the axial wind and the velocity of the cross wind using the following Equations 1 and 2, $$\vec{U1} = \vec{U} \times \cos\theta + (\vec{V} \times \cos\phi + \vec{W} \times \sin\phi) = \sin\theta$$

$$\vec{U2} \times \vec{U} \times \cos\theta - (\vec{V} \times \cos\phi + \vec{W} \times \sin\phi) = \sin\theta \quad \text{[Equation 1]}$$

in which $\vec{U1}$ is the first wind velocity measured by the anemometer, $\vec{U2}$ is the second wind velocity measured by the anemometer, $\theta$ is a half an angle between $\vec{U1}$ and $\vec{U2}$, and $\phi$ is a rotation angle of the nosecone and when $\vec{U1}$ and $\vec{U2}$ are parallel to the ground, $\phi$ is "zero" degree, and $$\vec{U} = (\vec{U1} + \vec{U2})/(2 \times \cos\theta)$$

$$\vec{V} = (\vec{U1} - \vec{U2})/(2 \times \cos\phi \times \sin\theta) - \vec{W} \times \tan\phi \quad \text{[Equation 2]}$$

in which $\vec{U}$ is the velocity of the axial wind, $\vec{V}$ is the velocity of the cross wind, and $\vec{W}$ is a velocity of a vertical wind blowing in a direction perpendicular to the ground.

9. The yaw angle control apparatus according to claim 8, wherein as the velocity $\vec{V}$ of the cross wind, an average value when $\phi$ is "0" degree and "180" degrees is used.

10. The yaw angle control apparatus according to claim 7, wherein the control unit is configured to perform operations including:
    determining whether an absolute value of the velocity of the cross wind is smaller than an allowable reference value; and
    adjusting the yaw angle when the absolute value of the velocity of the cross wind is equal to or larger than the reference value.

11. The yaw angle control apparatus according to claim 10, wherein in the adjusting of the yaw angle, the yaw angle of the rotary shaft is controlled such that a magnitude of the velocity of the cross wind is reduced.

12. The yaw angle control apparatus according to claim 10, wherein the control unit is configured to perform operations further including:
    starting adjusting a pitch angle of a blade so as to interwork with the axial wind when the absolute value of the velocity of the cross wind is smaller than the reference value.

13. A yaw angle control method of a wind turbine using the yaw angle control apparatus of a wind turbine according to claim 7, the method comprising:
    measuring the first and second wind velocities;
    calculating the velocity of the axial wind and the velocity of the cross wind using the measured first and second wind velocities; and
    controlling a yaw angle of the rotary shaft using the calculated velocity of the cross wind.

14. The yaw angle control method according to claim 13, wherein in the calculating, the velocity of the axial wind and the velocity of the cross wind are calculated using the following Equations 1 and 2, $$\vec{U1} = \vec{U} \times \cos\theta + (\vec{V} \times \cos\phi + \vec{W} \times \sin\phi) = \sin\theta$$

$$\vec{U2} \times \vec{U} \times \cos\theta - (\vec{V} \times \cos\phi + \vec{W} \times \sin\phi) = \sin\theta \quad \text{[Equation 1]}$$

in which $\vec{U1}$ is the first wind velocity measured by the anemometer, $\vec{U2}$ is the second wind velocity measured by the anemometer, $\theta$ is a half an angle between $\vec{U1}$ and $\vec{U2}$, and $\phi$ is a rotation angle of the nosecone and when $\vec{U1}$ and $\vec{U2}$ are parallel to the ground, $\phi$ is "zero" degree, and $$\vec{U} = (\vec{U1} + \vec{U2})/(2 \times \cos\theta)$$

$$\vec{V} = (\vec{U1} - \vec{U2})/(2 \times \cos\phi \times \sin\theta) - \vec{W} \times \tan\phi \quad \text{[Equation 2]}$$

in which $\vec{U}$ is the velocity of the axial wind, $\vec{V}$ is the velocity of the cross wind, and $\vec{W}$ is a velocity of a vertical wind blowing in a direction perpendicular to the ground.

15. The yaw angle control method according to claim 14, wherein as the velocity $\vec{V}$ of the cross wind, an average value when $\phi$ is "0" degree and "180" degrees is used.

16. The yaw angle control method according to claim 13, wherein the controlling includes:
    determining whether an absolute value of the velocity of the cross wind is smaller than an allowable reference value; and
    adjusting the yaw angle when the absolute value of the velocity of the cross wind is equal to or larger than the reference value.

17. The yaw angle control method according to claim 16, wherein in the adjusting of the yaw angle, the yaw angle of the rotary shaft is controlled such that a magnitude of the velocity of the cross wind is reduced.

18. The yaw angle control method according to claim 16, wherein the controlling further includes:
    starting adjusting a pitch angle of a blade so as to interwork with the axial wind when the absolute value of the velocity of the cross wind is smaller than the reference value.

19. A yaw angle control apparatus of a wind turbine using the anemometer according to claim 2, comprising:
    an arithmetic unit which calculates a velocity of an axial wind blowing in an axial direction of the rotary shaft of the hub and a velocity of a cross wind blowing in a direction which is perpendicular to the rotary shaft and is horizontal with a ground using the first and second wind velocities measured by the anemometer; and
    a control unit which controls a yaw angle of the rotary shaft using the velocity of the cross wind calculated by the arithmetic unit.

* * * * *